Jan. 19, 1960

V. L. HESSE ET AL 2,922,095

DIGITAL-TO-ANALOGUE CONVERTER

Filed April 15, 1958

INVENTORS:
William O. Felsman
Victor L. Hesse

By Seymour Schalnick
Attorney,

Jan. 19, 1960

V. L. HESSE ET AL 2,922,095

DIGITAL-TO-ANALOGUE CONVERTER

Filed April 15, 1958

INVENTORS:
William O. Felsman
Victor L. Hesse

By Seymour Schalnick
Attorney

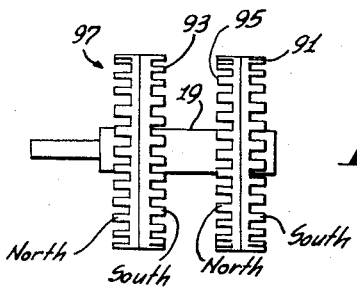

United States Patent Office 2,922,095
Patented Jan. 19, 1960

2,922,095

DIGITAL-TO-ANALOGUE CONVERTER

Victor L. Hesse, Playa Del Rey, and William O. Felsman, Tarzana, Calif., assignors to Litton Industries, Inc., Beverly Hills, California Application April 15, 1958, Serial No. 728,731

10 Claims. (Cl. 318—138)

This invention relates to a stepping circuit for stepping a salient pole synchronous motor and more particularly to a simplified stepping circuit generally applicable for stepping a two phase salient pole synchronous motors and for stepping such motors so that the number of steps per revolution of the motor shaft substantially exceeds the number of motor poles.

A stepping motor is a motor which is utilized in such a manner that the motor shaft is changed in angular position in discrete increments or steps, each positive or negative step that the shaft advances being dependent upon receipt of a corresponding + representing or − representing signal by an associated stepping circuit. A stepping motor is utilized to advantage where it is desired to convert a bivalued digital signal train to a corresponding analogue signal. Assuming, for example, a digital signal train to be converted comprises a sequence of bivalued signals, each signal of the train representing either a +1 value or a −1 value, a stepping circuit for use with a motor would be mechanized in such a manner that a +1 signal has the effect of driving the motor shaft one step in one direction of rotation while a −1 signal moves the shaft one step in the opposite direction of rotation so that the rotational position of the motor shaft continually represents the summation or integral of the + and − values of the signals of the digital signal train.

In the prior art, in the Univac Unityper system a 96-pole synchronous motor is utilized with an associated stepping circuit to move a metal tape stepwise past a writing head. The structure and operation of this stepping circuit is described in detail in a report entitled "Review of Input and Output Equipment Used in Computing Systems," at page 57, published in March 1953, by the American Institute of Electrical Engineers. In operation, the stepping circuit applies a 90 volt D.C. (direct current) signal to alternate stator poles for holding a motor rotor static. When the stepping circuit is actuated to step the rotor in a forward direction a stepping pulse generated by the stepping circuit is applied to the remaining poles of the stator and the polarity of the applied D.C. signal is reversed for a period slightly longer than the duration of the stepping pulse, whereby the rotor is stepped one step in the forward direction. If it is desired to step the rotor in the reverse direction it is necessary first to actuate the stepping circuit in such a manner that it reverses the poles to which the D.C. signal and the stepping pulse are applied before the stepping circuit can be actuated in the usual manner.

It is apparent from the foregoing discussion that this stepping circuit is not generally applicable for stepping two phase synchronous motors. In addition, it can be shown that each step is equivalent in length to the distance between two corresponding points on adjacent poles. It can be shown that this fact limits the rotor to a maximum of 48 steps per revolution. Furthermore, the voltage of the D.C. signal and the duration and waveform of the stepping pulse must be carefully maintained in order to prevent stepping failures.

Another type of prior art stepping circuit is disclosed in U.S. Patent 2,706,270, issued April 12, 1955, to F. G. Steele, entitled "Digital Control System." This stepping circuit generates a pair of stepping signals which are capable of stepping only a specially wound type of motor described in the Steele patent. Therefore, the stepping circuit described by Steele is not generally applicable for stepping two phase synchronous motors. Secondly, the rotor is capable of taking only as many steps in the course of one revolution as there are poles on the stator shaft.

It is apparent from the foregoing discussion that there is no stepping circuit available in the prior art which is generally applicable for stepping the many types of two phase synchronous motors known in the art. Furthermore, the use of stepping motors of the prior art has been limited by the fact that the motor rotor can advance only as many steps in one revolution of the rotor as there are motor poles. Therefore, digital signal trains whose summation value is high could not be represented by the rotor position without the use of a high ratio reduction gearing device, attached to the rotor shaft. High ratio gearing devices, however, have a substantial amount of backlash which limits the accuracy of the stepping circuit. Furthermore, a substantial amount of friction is introduced by the use of such gearing devices and since salient pole motors having a large number of poles develop little torque, very little gearing should be used with such motors. Thus, there is a need for a stepping circuit that is generally applicable to all types of two phase synchronous motors and that can provide a predetermined number of steps per revolution of a motor shaft wherein said predetermined number substantially exceeds the number of motor poles.

The present invention provides a stepping circuit for use with any multiple salient pole rotor and stator synchronous motor and is operable for generating a pair of multilevel actuating signals to establish a plurality of magnetically stable positions between adjacent stator poles, thereby, providing a predetermined number of steps per revolution of the motor shaft which is in excess of the number of motor poles.

In a first embodiment of the invention, a pair of stepping currents, each having a first polarity or second polarity are applied to the stator windings of a multiple salient pole stator and rotor synchronous motor thereby, selectively generating one of a plurality of four predetermined magnetically stable positions between each adjacent stator pole. The selected one of the four magnetically stable positions is dependent, of course, on the polarities of the stepping currents. The rotor remains static in the selected one of the magnetically stable positions until the polarity of one of the two stepping currents is changed providing a different one of the four magnetically stable positions and actuating the rotor to move selectively clockwise or counterclockwise to the new magnetically stable position. In this way, there are provided four times as many steps per revolution as there are poles of the motor.

In a second embodiment of the invention the stepping currents are applied to the stator windings of the motor thereby selectively generating one of a plurality of eight magnetically stable positions between adjacent stator poles. In this manner there are provided eight times as many steps per revolutions as there are stator poles.

It is therefore, an object of the present invention to provide a stepping circuit for use with a multiple salient pole rotor and stator synchronous motor to produce a predetermined number of steps in each revolution of a motor shaft, the predetermined number of steps being substantially greater than the number of stator poles.

Another object of the invention is to provide a stepping circuit which is generally applicable for stepping the many types of two phase synchronous motors in use.

Still another object of the invention is to provide a stepping circuit for use with a multiple pole rotor and stator synchronous motor which generates two actuating signals having positive and negative levels to establish a plurality of four predetermined magnetically stable positions between adjacent stator poles.

A still further object of the invention is to provide a stepping circuit for generating a first and a second stepping current, each having first and second polarities, which is responsive to a first input signal for changing the polarity of one of said stepping currents and to a second input signal instead of the first input signal for generating the stepping signals with polarities that are complementary to the polarities that would have been generated in response to the first input signal.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figures 3a–d are developed segmentary views of the positions of the rotor poles with respect to the stator poles for a plurality of four polarity combinations of the stator poles.

Figures 4a–e and 5a–e are waveform charts of signals generated by the stepping circuit of the invention, plotted on a common time axis.

Figure 6 is an elevational front view of a rotor of a motor utilizable with a second embodiment of the invention.

Figure 1:
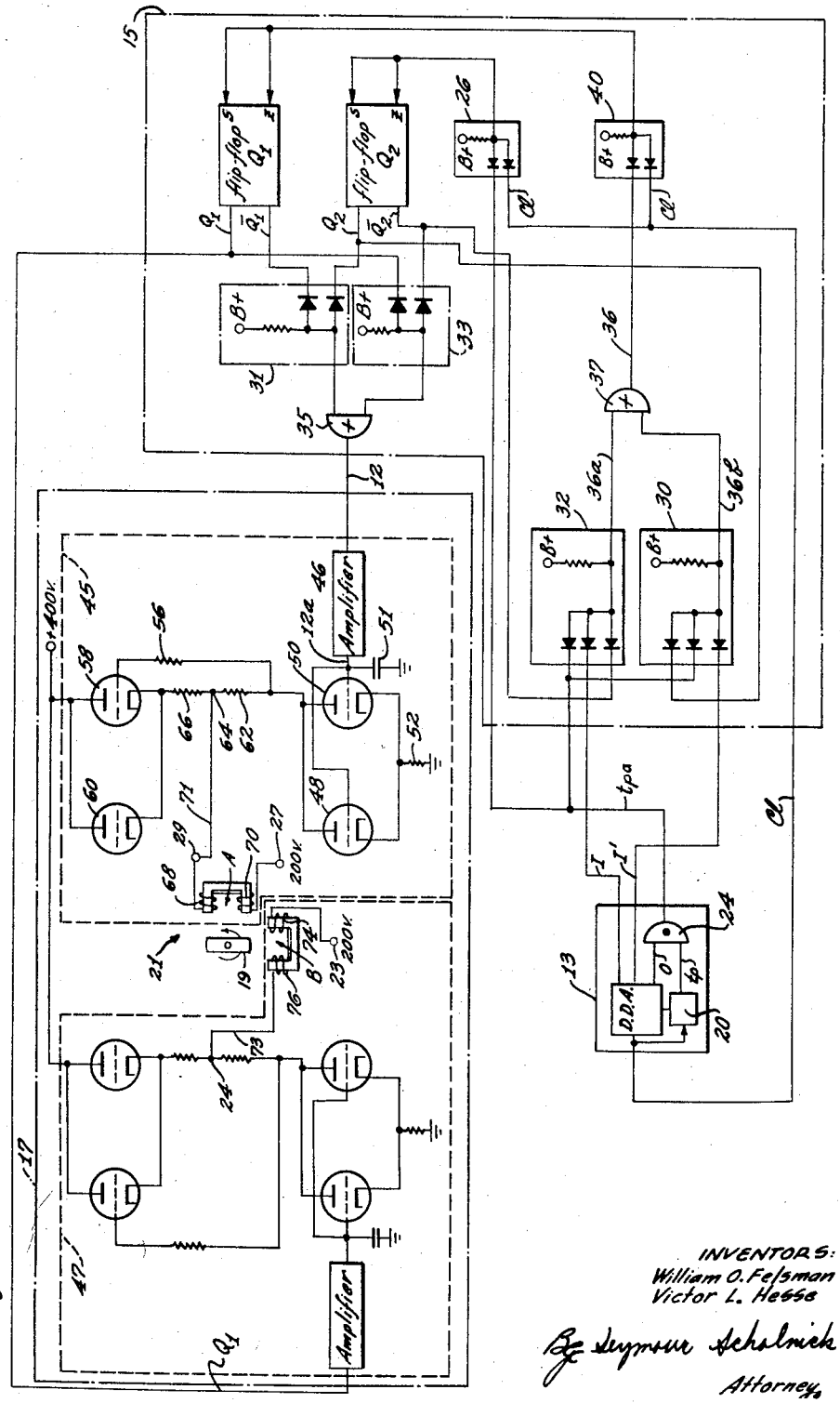
Figure 1 is partly block, partly circuit diagram of a stepping circuit in accordance with the invention.

Referring now to the drawings, wherein like or corresponding parts are designated by the same reference characters throughout the several views, there is shown in Fig. 1 a partly block, partly circuit diagram of a stepping circuit in accordance with the invention, wherein a bilevel digital signal train I having +1 and −1 increment representing values is converted to an analogue signal.

As shown in Fig. 1, signal source 13 generates digital input signal I and a complementary signal $\bar{I}$, a gated timing signal $t_{pa}$ and a clock pulse C1. These four signals are applied over correspondingly designated conductors to an actuator 15 which is responsive to the four signals to generate a pair of bileveled actuating signals designated as signal $Q_1$ and signal 12. (For purposes of facilitating and clarifying description, each conductor will be hereinafter similarly designated in terms of the signal applied over the conductor.) Signals $Q_1$ and 12, are applied to a stepping generator 17, which includes a pair of steppers 45 and 72 and a motor 21 having a rotor shaft 19. The stepping generator is responsive to the applied signals $Q_1$ and 12 to generate a pair of stepping currents 71 and 73 for rotating shaft 19 in the clockwise or counter-clockwise direction, the angular position of the rotated shaft being the desired analogue signal.

Figure 2A:
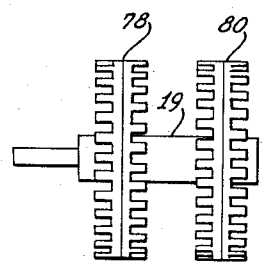
Figure 2a is a elevational front view of the rotor of a motor utilizable in the practice of the invention.
Figure 2B:
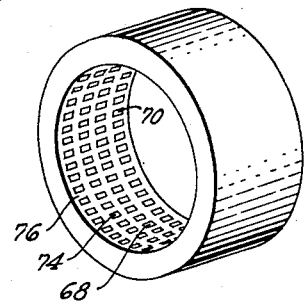
Figure 2b is an isometric view of the stator element of the motor utilizable in the practice of the invention.

In order to facilitate the understanding of the manner in which rotor shaft 19 of motor 21 is stepped, attention is directed to Figures 2a and 2b wherein there is shown a particular one of the many types of motors that can be stepped by the stepping circuit of the invention; namely, a 72 pole-synchronous motor, model 55MY200, manufactured by the General Electric Corporation. Specifically, there is shown in Fig. 2a an elevational front view of rotor shaft 19. As indicated in Fig. 2a, rotor shaft 19 is a permanent magnet having a plurality of salient north poles on a side 78 and a plurality of south poles on a side 80. The north poles on side 78 of the rotor shaft are arranged in two rows each containing 36 poles. As shown in Fig. 2a, the poles contained in one row are 180 degrees out of phase with the poles contained in the other row. The south poles on side 80 of the rotor shaft are arranged in a manner similar to the north poles but, in addition, are 90 degrees out of phase with the north poles.

There is shown in Fig. 2b an isometric view of the stator housing of the motor with the rotor removed. As shown in Fig. 2b, there are a series of four circular rows of salient stator poles 68, 70, 74, and 76 arranged on the stator housing in a manner such that when the rotor shaft is positioned within the stator housing and commences rotating each stator pole row will be in register with the circular path followed by the poles contained in one of the four rotor pole rows. Each circular row of stator poles includes 36 poles and, for ease of description, the poles in each poles row are herein designated by the reference character of the row containing it. For example, a pole in row 68 is designated pole 68. Furthermore, each group of colinear poles 76, 74, 68, and 70 are herein referred to as a stator pole group. It should be noted at this time that a winding A of rotor 20, to which stepping current 71 is applied, is wound around poles 68 and 70 in opposite direction so that the poles 68 and 70 have opposite polarities while a winding B, to which stepping signal 73 is applied, is wound around poles 74 and 76 in opposite directions so that poles 74 and 76 have opposite polarities. It is apparent then since both stepping currents 71 and 73 can have either of two polarities that poles 70, 74, 68 and 76 have four different polarity combinations.

Figure 3A:
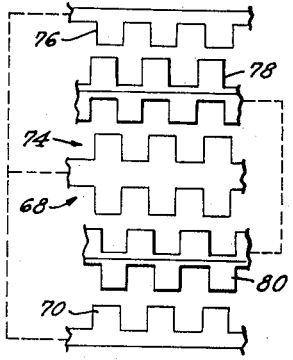

Referring now to Figs. 3a through 3d, there are shown developed segmentary views of the positions of the poles of rotor shaft 19 with respect to the stator poles for the four polarity combinations of poles 70, 74, 68 and 76. There is shown in Fig. 3a the static position of rotor 19 relative to the stator poles when actuating signals 12 and $Q_1$ are at their high levels. The fact that rotor 19 will remain static in this position will be obvious from the following discussion.

It can be shown that the magnetic field generated by both the stator and rotor poles is restricted to the specific area surrounding the poles so that for a rotor and a stator pole to generate an attracting or repelling force at least a portion of the face of the rotor pole must be opposite the face of the stator pole. When it is noted, as will be hereinafter shown, that actuating signals 12 and $Q_1$ both at their high levels actuate teeth 70 and 74 to be north poles and teeth 68 and 76 to be south poles, it will be evident from the following that rotor 19 is in a magnetically stable position. As shown in Fig. 3a, each south pole of one of the pole rows on side 80 of the rotor has three fourths of its face opposite the face of a pole of the north polarized stator row 70 thereby generating a ¾ maximum force in the counter-clockwise direction while each south pole of the other pole row on side 80 has one-fourth of its face opposite a pole of the south polarized stator row 68 thereby generating a ¼ maximum force in the clockwise direction. Each north pole of one of the pole rows on side 78 of the rotor has one-fourth its face opposite the face of a pole of the north polarized stator row 74 thereby generating a ¼ maximum force in the counter-clockwise direction while each north pole of the other pole row on side 78 of the rotor has three-fourths its face opposite a south polarized pole of stator row 76 thereby generating a ¾ maximum force in the clockwise direction. If the four herein mentioned forces are summed the resultant is zero and if rotor shaft 19 moves either clockwise or counter-clockwise slightly a corrective force is generated to force it back to the stable position.

Figure 3B:
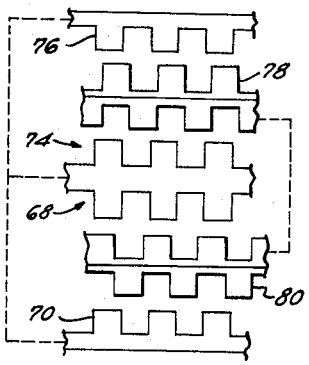

Referring now to Fig. 3b, if actuating signal 12 is at the low level, tooth 70 becomes south polarized and tooth 68 becomes north polarized. In Fig. 3b there is shown the stable position of the rotor shaft under the condition that actuating signals 12 and $Q_1$ are at the low and high levels, respectively. The fact that the position shown is a stable position can be proved by balancing the forces in the same manner hereinbefore described.

Figure 3C:
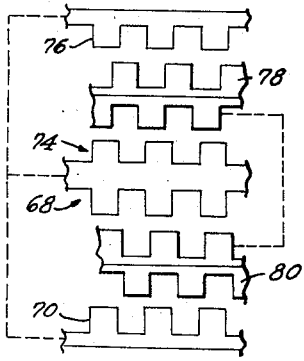
Figure 3D:
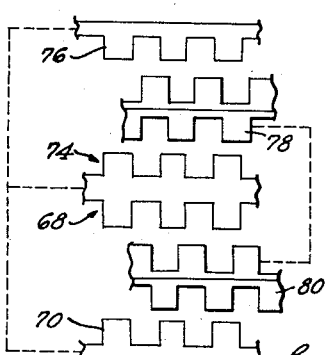

There is shown in Fig. 3c the stable position of rotor shaft 18 when actuating signals $Q_1$ and 12 are both at their low levels, while in Fig. 3d there is shown the stable position of rotor shaft 19 when actuating signals 12 and $Q_1$ are at their high and low levels, respectively. It is hereinafter shown that when actuating signals $Q_1$ and 12 are at the low levels teeth 70 and 74 are south polarized while teeth 68 and 76 are north polarized and when actuating signals 12 and $Q_1$ are at their high and low levels, respectively, teeth 70 and 76 are north polarized while teeth 68 and 74 are south polarized. It should be noted that in each successive stable position of rotor shaft 19 as shown in Figs. 3a–3d the rotor has been stepped successively clockwise a distance corresponding to one half the width of a pole.

Referring now to Table A, presented hereinbelow, there is represented the configuration of the levels of signals 12 and $Q_1$ necessary to generate the four magnetically stable positions. The configurations of the levels of the two actuating signals necessary to generate the magnetically stable positions shown in Figs. 3a to 3d are represented on rows 1 to 4, respectively. Each of the four configurations of the two actuating signals is hereinafter designated by the number of the row on which it is designated. For example, the configuration shown on row 1 is designated configuration 1. As shown in Table A, the high and low levels of the actuating signals are represented by numerals 1 and 0, respectively. It is evident from the foregoing discussion that a transition from configuration 4 to 3, 3 to 2, 2 to 1, or 1 to 4 steps rotor 19 one step in the counter-clockwise direction. Therefore, by successive transitions of the configurations from configuration 4 to 3 to 2 to 1 and back again to 4, rotor shaft 19 takes successive steps in the counter-clockwise direction. It is evident, of course, that a transition from a preceding configuration to another configuration represented on the row directly beneath the preceding configuration moves rotor shaft 19 in the clockwise direction.

Table A

| Row | $Q_1$ | 12 |
| --- | --- | --- |
| 1 | 1 | 1 |
| 2 | 1 | 0 |
| 3 | 0 | 0 |
| 4 | 0 | 1 |

As will be hereinafter explained, in detail, actuator 15 is responsive to each digital input signal I, having an incremental value of +1 or −1, to generate the two actuating signals at levels such that the rotor shaft is moved one step in the counter-clockwise or clockwise directions, respectively. Thus a transition which causes a counter-clockwise rotor movement is designated a positive transition and a transition which causes a clockwise rotor movement is designated a negative transition.

Referring now to the generation of stepping currents 71 and 73, attention is directed to steppers 45 and 47, as shown in Fig. 1. Stepper 45 is responsive to actuating signal 12 having high and low levels for generating stepping current 71 having forward and reverse polarities, respectively, and stepper 47 is responsive to actuating signal $Q_1$ having high and low levels for generating stepping current 73 having forward and reverse polarities, respectively. As shown in Fig. 1, when stepping current 71 has the forward polarity, it flows through winding A from a terminal 27 to a terminal 29 thereby north polarizing pole 70 and south polarizing pole 68, while when it has the reverse polarity its flow is reversed thereby reversing the polarity of poles 70 and 68. When stepping current 73 has the forward polarity, it flows through winding B from a terminal 23 to a terminal 24 thereby north polarizing pole 74 and south polarizing pole 76, while when it has the reverse polarity its flow is reverse thereby reversing the polarity of poles 74 and 76.

Referring now in detail to stepper 45, a non-inverting amplifier 46 within stepper 45 amplifies actuating signal 12 and the amplified signal is then applied over a conductor $12_a$ to the grids of a pair of triode tubes 48 and 50. One terminal of a capacitor 51 is coupled to conductor $12_a$ while the other terminal is coupled to a source of ground potential. The cathodes of tubes 48 and 50 are connected to a source of ground potential through a resistor 52. The plates of the two triodes are connected through a resistor 56 to the grids of a pair of triode tubes 58 and 60, while the plates of tubes 48 and 50 are further connected through a resistor 62, a terminal 64, and a resistor 66 to the cathodes of tubes 58 and 60. The plates of tubes 58 and 60 are connected to a 400 volt source of potential.

In operation when actuating signal 12 at the high level is applied to tubes 48 and 50 the tubes are highly conductive and stepping current 71 flows from the 200 volt source through winding A and tubes 48 and 50, to the source of ground potential. Noticing the directions in which winding A is wound on poles 68 and poles 70, poles 68 and 70 become south and north polarized, respectively. If now actuating signal 12 at the low level is applied to tubes 48 and 50 the tubes are non-conductive and therefore, no current flows through the tubes so that the voltage on the plates of the two tubes rises. The grids of tubes 58 and 60 being coupled to the plates of tubes 48 and 50 thereby become conductive. Stepping current 71 now flows from the 400 volt source through tubes 58 and 60 and winding A to the 200 volt source of potential; therefore, poles 68 and 70 become north and south polarized, respectively.

As will be hereinafter more fully explained and as shown in Fig. 4e, actuating signal 12 can alternate between high and low levels when digital signal train I has a zero value. It should be noted that since digital input signals I have only an incremental value of +1 and −1, a zero valued input can be expressed only by alternate +1 and −1 values. As will be herein more fully explained this alternation will cause the rotor 19 to step one step in one direction and then one step in the other direction. In order to prevent any resonant overshoot of the rotor during this alternation period capacitor 51 is connected to conductor 12a and has a value such that signal 12 when alternating is appreciably attenuated, thereby preventing any such overshoot of the rotor.

It is clear that the function of stepper 72 is identical to that of stepper 45 except that stepping current 73 determines the polarity of poles 74 and 76. When signal $Q_1$ is at its high level poles 74 and 76 are north and south polarized, respectively, while the polarity at the two poles is reversed when signal $Q_1$ is at its low level. As shown in Fig. 1, the structure of stepper 72 is identical to that of stepper 45 and thus no further discussion of this structure is required herein.

Referring now to the generation of actuating signals 12 and $Q_1$ by actuator 15, attention must first be directed to the nature of the signals generated by signal source 13. Signal source 13 may comprise any suitable source of digital signals representing successive increments of an output variable and as shown in Fig. 1 is assumed for purposes of example to comprise a Litton 20 digital differential analyzer (dda) manufactured by Litton Industries, Beverly Hills, California, which includes a plurality of integrators, each of the integrators generating in sequence a digital signal and its complement. The digital signals from the integrators are multiplexed in sequence to form the train of digital signals I while the complementary signals are multiplexed in the same manner to form complementary signal Ī. The dda generates "on" signal O having a positive level whenever the dda is computing and a negative level when it is not. Further, the Litton 20 generates clock pulse C1 concurrently with every incremental digital signal I, clock pulse C1 being a negative clocking pulse of short duration compared to the incremental digital signal I.

As shown in Fig. 1, digital signal train I and clock pulse C1 are applied to a counter circuit 20 which is responsive thereto for generating a positive timing signal $tp$, which is one digital signal duration in length. Counter circuit 20 generates timing pulse $tp$ concurrently with the generation of the digital signal from a predetermined one of the twenty integrators of the Litton 20 computer, thereby providing a means to identify the signals originating from any predetermined integrator. A number of ways to mechanize counter circuit 20 will be evident to one skilled in the art; therefore, the mechanization need not be further discussed herein. Timing signal $tp$ is applied to an "and" gate 24 along with "on" signal O, gate 24 being responsive thereto for generating gating timing signal $tpa$.

Gate 24 is a specific type of gate identified in the art as an "and" gate. This "and" gate and the "and" gates to be hereinafter discussed are operable to generate a positive valued signal when all the applied signals are positive valued signals and to generate a negative valued signal when any one of the applied signals is a negative valued signal. Therefore, gate 24 generates positive pulse gated timing signal $tpa$ when "on" signal O at the high level is being generated. Gated timing signal $tpa$, clock pulse C1, digital input signal I and complementary signal Ī are applied over correspondingly designated conductors to actuator 15.

Actuator 15 includes a flip-flop circuit $Q_1$, a flip-flop circuit $Q_2$, and a plurality of "and" and "or" gates 26, 30, 31, 32, 33, 35, 37 and 40. Each of the flip-flop circuits has two stable states and is operable to produce an output signal having high and low levels and a complementary signal, the signals being designated by the reference character of the flip-flop and their levels being determined by the state of operation of the flip-flop.

Actuator 15 is responsive to each successive incremental input signal I from the predetermined integrator, as identified by the negative gated timing pulse $tpa$, for producing a transition in the configuration of the levels of actuating signals 12 and $Q_1$. More specifically, actuator 15 is responsive to a high level or +1 representing incremental input signal I to produce a positive transition and to a low level or −1 representing incremental input signal I to produce a negative transition.

As indicated in Fig. 1, and as will be explained in more detail hereinbelow, gating circuit 26 responds to the input signals to change the state of flip-flop $Q_2$ upon receipt of the gated timing signal $tpa$ while gating circuits 30, 32, 36 and 40 respond to the input signals and the flip-flop $Q_2$ output signal $Q_2$ to change the state of flip-flop $Q_1$ whenever signal $Q_2$ and input signal I are at the opposite levels. Gating circuits 31, 33, and 35 are responsive to the receipt of signals $Q_1$ and $Q_2$ having opposite levels to generate signal 12 having a high level.

Referring now to Table B, which is similar to Table A except the corresponding level of signal $Q_2$ is shown, it is evident from the foregoing discussion of the rules mechanized by actuator 15, that a +1 digital input signal I will cause the levels of the actuating signals $Q_1$ and 12 to change from the preceding levels to levels that correspond with the levels represented on the row directly above the preceding level, as shown in Table B. If a −1 digital input signal I is received the levels of the actuating signals $Q_1$ and 12 will change from the preceding levels to correspond with the levels represented on the row directly below the preceding levels, as shown in Table B.

Table B

| Row | $Q^1$ | 12 | $Q^2$ |
|---|---|---|---|
| 1 | 1 | 1 | 0 |
| 2 | 1 | 0 | 1 |
| 3 | 0 | 0 | 0 |
| 4 | 0 | 1 | 1 |

As hereinbefore explained in connection with Table A, stepping generator 17 is responsive to the receipt of the actuating signals generated by a +1 digital input signal I to step the rotor shaft in one direction and to the actuating signals generated by a −1 digital input signal I to step the rotor shaft in the opposite direction.

Directing attention now to the detailed structure of actuator 15 as shown in Figure 1, timing signal $t_{pa}$ is applied to one input of "and" gate 26 while the clock pulse C1 is applied to the other input of gate 26. It is clear that when timing signal $tpa$ is applied to gate 26 the output of the gate is relatively high; however, when the trailing edge of timing signal $tpa$ is reached clock pulse C1 occurs and rapidly pulls down the output of the gates to a negative level, thereby generating a sharp negative pulse corresponding to clock pulse C1. The output signal of gate 26 is applied to the S and the Z input of flip-flop $Q_2$, to be hereinafter discussed.

Referring now with particularity to flip-flop $Q_2$, wherein high and low voltage level signals are generated in response to the applied sharp negative pulse generated by gate 26 at the S and Z inputs. Flip-flop $Q_2$ produces an output signal $Q_2$ having high and low voltage levels in accordance with the state of the flip-flop and also produces complementary signal $\bar{Q}_2$.

In operation flip-flop $Q_2$ is responsive to the application of an input signal to its S input terminal for being set to its "set" state and to the application of an input signal to its Z input terminal for being set to its "zero" state. The flip-flop is responsive to the simultaneous application of an input signal to both the S and Z inputs to change its state of operation. When flip-flop $Q_2$ is in its "set" state, signal $Q_2$ will be at its high level while complementary signal $\bar{Q}_2$ will be at its low level. Conversely, when flip-flop $Q_2$ is at its zero state, signal $Q_2$ will be at its low level while complementary signal $\bar{Q}_2$ will be at a high level.

Since gate 26 applies gated timing signal $tpa$ to both the S and Z input of flip-flop $Q_2$ simultaneously, the flip-flop will change its states of operation upon application of the negative pulse generated at gate 26, to the flip-flop inputs, thereby changing the levels of signals $Q_2$ and $\bar{Q}_2$. Signals $Q_2$ and $\bar{Q}_2$ are applied to "and" gates 30 and 32 while digital signal I is applied to gate 32 and complementary signal Ī is applied to "and" gate 30. In addition, gated timing signal $tpa$ is applied to "and" gates 30 and 32.

Since the operation and structure of an "and" gate has been discussed it will only be herein noted that "and" gate 32 is operable to generate a high level pulse width gating signal 36a when gated timing signal $tpa$, signal $\bar{Q}_2$ at the high level, and digital signal I at the high level are concurrently applied to the gate. Gate 30 generates a high level pulse width gating signal 36b when gated timing signal $tpa$, signal $Q_2$ at the high level and complementary signal Ī at the high level are concurrently applied to the gate. Signals 36a and 36b are applied to a first and a second input terminal of an "or" gate 37. The "or" gate functions to generate a pulse width signal 36 when either signal 36a or 36b is applied to the gate, signal 36 being applied to a first input terminal of an "and" gate 40. A number of circuits suitable for use as "or" gate 37 will be evident to one skilled in the art. Therefore, the structure of gate 37 will not be herein discussed.

Referring now to "and" gate 40, clock pulse C1 is applied to a second input of gate 40 and the gate passes the clock pulse to an S and Z input of flip-flop $Q_1$ when signal 36 is concurrently applied thereto.

Flip-flop $Q_1$ is identical in structure and operation to flip-flop $Q_2$ except that the corresponding symbols of flip-flop $Q_1$ carry the subscript 1 rather than 2, as in flip-flop $Q_2$. For example, the output signals of flip-flop $Q_1$ are designated $Q_1$ and $\bar{Q}_1$. Actuating signal $Q_1$ is applied to an input of gate 33 and to stepping generator 17 while signal $\bar{Q}_1$ is applied to an input of gate 31.

Gates 31 and 33 are simple "and" gates and thus are responsive to signals $Q_2$ and $\bar{Q}_1$ and signals $Q_1$ and $\bar{Q}_2$ respectively, to generate bilevel actuating signal 12a and a bilevel actuating signal 12b, respectively, both signals 12a and 12b having either a high or a low level. Signal 12a at the high level is generated whenever all the input signals to gate 31 are at their high levels and signal 12b at the high level is generated whenever all the input signals to gate 33 are at their high levels. Signals 12a and 12b are applied to a first and a second input terminal, respectively of an "or" gate 35 for generating an actuating signal 12 having a high level whenever either signal 12a or 12b has a high level. Actuating signal 12 along with actuating signal $Q_1$, are applied to stepping generator 17 which is responsive thereto to step a motor therein.

Referring now to the overall operation of actuator 15, attention is directed to Figs. 4a–4e and 5a–5e, wherein there are shown the waveforms generated by actuator 15 plotted against a common time axis for a number of different digital signal values. In Figs. 4a–4e there are shown waveforms generated by actuator 15 in response to a digital signal train I having a number of +1 and −1 incremental digital signals and in Figs. 5a–e there are shown waveforms generated in response to digital signal train I having a plurality of +1 value incremental digital signals. It should be herein noted that the value of digital signal train I herein specified is the value only of digital signals generated by the predetermined integrator.

Assume now that the predetermined integrator of the Litton 20 whose digital signal output is to be converted to an analogue signal generates digital signal train I and its complement $\bar{I}$ having successive values −1, +1, −1, +1, +1, +1, and −1. Excluding those digital signals generated by other than the predetermined integrator from the digital signal train I and replacing them with dots, there results a waveform shown in Fig. $4a_1$. In Fig. $4a_2$ there is shown the waveform of complementary signal train $\bar{I}$ with all digital signals except those generated by the predetermined integrator replaced by dots, as will be the case in the other waveforms of signal train I and complementary signal train $\bar{I}$ in Figs. 4 and 5. As shown in Fig. 4b, gated timing signal tpa generated by gate 24 comprises a plurality of high level pulse signals. In Fig. 4c there is shown the waveform of output signal $Q_2$. It can be seen that signal $Q_2$ alternates between positive and negative levels every gated timing signal pulse tpa. This is true since flip-flop $Q_2$ changes state every time gated timing signal tpa of Fig. 4b is at the high level concurrently with the occurrence of clock pulse C1.

Gates 30 and 32 generate pulse signal 36 whenever digital signal train I and signal $Q_2$ are at opposite levels. As hereinbefore explained, pulse signal 36 causes flip-flop $Q_1$ to change levels. As shown in Figs. $4a_1$, $4a_2$ and 4c, the two signals $Q_2$ and I are at opposite levels at only one time so that flip-flop $Q_1$ changes level only once, as shown in Fig. 4d.

Gates 33 and 31 generate signal 12 having a high level whenever signals $Q_1$ and $Q_2$ are at opposite levels. Therefore, signal 12 has the waveform shown in Figure 4e.

Examining now the manner in which stepping generator 17 will respond to the receipt of actuating signals $Q_1$ and 12, as shown in Figures 4d and 4e, attention is again directed to Table A. As shown at the extreme left of Figures 4d and 4e the initial levels of both actuating signals $Q_1$ and 12 are shown at their low levels and are represented on row 3 of Table A. When a −1 digital input signal I is received, actuating signal 12 is generated having a high level. The levels of the two actuating signals are now represented on row 4, therefore, rotor shaft 19 has been stepped one step in the negative direction upon receipt of the −1 digital input signal I. Actuating signal 12 is generated having a low level upon receipt of the next digital input signal I which has a +1 incremental value and the actuating signals are again represented on row 3 indicating that rotor shaft 19 has been stepped one step in the positive direction by stepping generator 17. Upon receipt of the next digital input signal I, which has a −1 incremental value, actuating signal 12 again is generated at the high level and the levels of the actuating signals are again represented on row 4. Therefore, rotor shaft 19 is stepped one step in the negative direction. A +1 valued digital input signal I is next generated and actuating signal 12 is generated by actuator 15 at the low level thereby stepping rotor shaft 19 one step in the positive direction since the levels of the actuating signals are again represented on row 3 of Table A.

It should be herein noted that at this point two −1 valued and two +1 valued incremental input digital signals I have been received which should result in no overall movement of rotor shaft 19. As herein stated, the levels of the actuating signals were represented originally on row 2 and are now represented on row 2 so that it is evident that rotor shaft 19 has in fact been subjected to no overall movement. Continuing with the discussion, a +1 valued digital input signal I is next generated which causes actuating signal $Q_1$ to change to its high level. The levels of actuating signals $Q_1$ and 12 are now represented on row 2 thereby indicating that rotor shaft 19 steps one step in the positive direction. The next successive digital input signal I also has a +1 value which causes actuating signal 12 to be generated at its high level also so that the levels of the actuating signals are now represented on row 1 which indicates that rotor shaft 19 has again stepped one step in the positive direction. As shown in Figure $4a_1$, the last digital input signal to be generated has a −1 incremental value and the application of this signal to actuator 15 causes actuating signal 12 to be generated at its low level. The actuating signals now are represented on row 2 of Table A. Stepping generator 17 is, of course, responsive to this change from row 1 to row 2 to step rotor shaft 19 one step in the negative direction. It will be noted that the final levels of actuating signals $Q_1$ and 12 are represented on row 2 of Table A and since the initial levels of the actuating signals were represented on row 3 of the table the overall movement of rotor shaft 19 amounts to one step in the positive direction. Since the total sum of the incremental values of the digital input signal I shown in Figure $4a_1$ has a +1 value, the movement of rotor shaft 19 is in accord with the total value of the digital input signal I applied to actuator 15.

To further illustrate the operation of the actuator of the invention there are shown in Figs. 5a–e the waveforms generated in response to a plurality of +1 valued digital signals I. It is apparent from the foregoing discussion that rotor shaft 19 is moved one step in the positive direction in response to each +1 valued digital signal so that the seven +1 valued digital input signals shown in Fig. 5a move the rotor seven steps in the positive direction.

It should be herein noted that the stepping circuit of the invention is subject to many modifications. For example, there is shown in Fig. 6 a rotor element 19 of a second embodiment of the invention wherein there is selectively generated one of a plurality of eight stable positions between adjacent stator poles. As shown in Fig. 6, the rotor is similar to the rotor used in the first embodiment of the invention except that the poles included in a row 91 are permanently south polarized along with the poles included in a row 93 while the poles included in a row 95 and a row 97 are north polarized.

It is evident from the foregoing that each step in the second embodiment of the invention is one-fourth of the width of a pole in length. Furthermore, it can be shown that the same sequence of configurations shown in Table A steps the rotor in the same manner as in the first embodiment of the invention except that each configuration must be generated twice for the rotor to move from one point on a stator pole to a corresponding point on the next adjacent stator pole. For example, to perform such a movement in the positive direction the following transitions must take place, assuming the initial configuration to be 4; 4 to 3, 3 to 2, 2 to 1, 1 to 4, 4 to 3, 3 to 2, 2 to 1, 1 to 4.

In other modifications of the invention stepping generator 17 is mechanized in such a manner that the stepping generator is responsive to the actuating signals to pass current through winding A and B in both directions as well as to pass no current through one or both of the windings; therefore, generating eight predetermined magnetically stable positions between the center of each adjacent stator pole. As in the preferred embodiment of the invention the rotor remains static in one of the magnetically stable positions until the level of the stepping signals changes thereby producing a different magnetically stable position and actuating the rotor to move clockwise or counter-clockwise to the new magnetically stable position. In this regard it should be noted that the magnitude of the current levels of the actuating signals is such that the rotor is propelled to the next stable position without any substantial overshoot.

The invention herein disclosed can further be modified by coupling a potentiometer to the rotor shaft thereby resulting in the generation of an output voltage which varies directly with the value of digital input signal train I. For example, any one of a number of suitable 10 turn potentiometers, known in the art, can be coupled to the rotor shaft of motor 21, described in the first embodiment of the invention, by means of a 200/144 ratio reduction gear unit so that 2,000 different voltage magnitudes can be generated by the potentiometer.

It should be clear that numerous other alternations and modifications may be made in the stepping circuit of the invention herein disclosed without departing from the spirit and scope of the invention. For example, the General Electric 72 pole permanent magnetic synchronous motor may be replaced by any two phase synchronous motor known in the art. Accordingly, it is expressly understood that the invention is to be limited only by the spirit and scope of the appended claims.

What is claimed as new is:

1. A stepping circuit for stepping a rotor shaft one step in one direction of rotation in response to the application of a bilevel input signal having a first level and one step in an opposite direction of rotation in response to the application of an input signal having a second level, said stepping circuit comprising: a first bistable element being responsive to each input signal to change the level of said bilevel signal; first gating means responsive to said bilevel signal and the input signal when one of said signals is at its first level and the other is at its second level for generating a gated signal; a second bistable element for generating a first bilevel actuating signal having first and second levels, said second bistable element being responsive to said gated signal to change the level of said first actuating signal; second gating means responsive to said first actuating signal and said bilevel signal for generating a second actuating signal having a first level when one of said signals is at its first level and the other of said signals is at its second level and having a second level when said bilevel signal and said first actuating signal are both at their first levels or their second levels; a stepping generator responsive to said first and second actuating signals for generating first and second stepping currents, respectively, said first stepping current having first and second polarities when said first actuating signal has the first and second levels, respectively, and said second stepping current having first and second polarities when said second actuating signal has the first and second levels, respectively; and motor means responsive to said first and second stepping currents to step the rotor shaft.

2. The combination defined in claim 1 wherein said stepping generator further includes first switching means responsive to said first actuating signal at the first level for conducting said first stepping signal having its first polarity, second switching means operable in response to the application of a predetermined actuating signal for conducting said first stepping current having its second polarity, and control means coupled to said second switching means and responsive to the application of said first actuating signal at the second level for generating the predetermined actuating signal.

3. The combination defined in claim 1 wherein said motor means includes the rotor shaft and a stator element, the rotor shaft having four salient poles thereon and said stator element having first and second pole groups mounted thereon adjacent each other, each of said pole groups including four colinear poles, said motor means being further responsive to said stepping currents to move said four rotor salient poles to a corresponding one of four magnetically stable positions established between like points on said two adjacent stator pole groups, the four magnetically stable positions corresponding respectively to the four possible configurations of polarity of said second stepping currents.

4. The combination defined in claim 1 wherein said motor means includes the rotor shaft and a stator element, said stator element having two adjacent pole groups thereon, each of said pole groups including four colinear poles, the rotor shaft having first, second, third and fourth poles thereon, said first and second poles being adjacent one another and having opposite polarities and said third and fourth poles being adjacent one another and having opposite polarities, said motor means being further responsive to said stepping currents to move said four rotor salient poles to a corresponding one of eight magnetically stable positions established between like points on said two adjacent stator pole groups.

5. A stepping circuit for stepping a motor shaft one step in one direction of rotation in response to the application of an input signal having a first value and one step in an opposite direction of rotation in response to the application of an input signal having a second value, said stepping circuit comprising: first means selectively actuable for generating first and second stepping currents, each stepping current having first and second polarities, in four different polarity configurations; second means coupled to said first means and responsive to the input signal having the first value, when any selected one of said four configurations is being generated, for actuating said first means to change the polarity of only one of said stepping currents; third means coupled to said first means and responsive to the input signal having the second value when said same selected one of said configurations is being generated for actuating said first means to reverse the polarity of only the other of said stepping currents; a motor including a first motor winding and a second motor winding; and conductive means for applying said first stepping current to said first winding and said second stepping current to said second winding.

6. In a stepping circuit for moving a motor shaft in a forward or a reverse direction of rotation in response to the application of a first input signal having a first value and a second input signal having a second value, the combination comprising: first means selectively actuable for generating a first stepping current having first or second polarities and a second stepping current having third and fourth polarities; second means coupled to said first means and responsive to the application of the first input signal having the first value for actuating said first means to change the polarity of said first stepping current when said first and second currents are at said first and third polarities respectively or at said second and fourth polarities, respectively and to change the polarity of said second stepping current when said first and second stepping currents are at said first and fourth or second and third polarities, respectively, third means responsive to the application of the second input signal having the second value for actuating said first means to change the polarity of said second stepping current when said first and second stepping currents are at said first and third polarities, respectively, or at said second and fourth polarities, respectively, and to change the polarity of said first stepping current when said first and second stepping currents are at said first and fourth or second and third polarities, respectively.

7. The combination defined in claim 6 which further includes a motor having a first motor winding wound on first and second motor poles and a second motor winding wound on third and fourth motor poles and conductive means for applying said first stepping current to said first winding and said second stepping current to said second winding.

8. A stepping circuit for stepping a motor shaft one step in one direction of rotation in response to the application of an input signal having a first value and one step in an opposite direction of rotation in response to the application of an input signal having a second value, said stepping circuit comprising: first means for generating first and second stepping currents, each having first and second polarities, said first means being responsive to the receipt of the input signal having the first value for changing the polarity of one of said stepping currents and to the input signal having the second value instead of the first value for generating said stepping currents having polarities which are complementary to the polarities that would have been generated in response to the input signal having the first value; a motor including a first motor winding wound on first and second motor poles and a second motor winding wound on third and fourth poles; and conductive means for applying said first stepping current to said first winding and said second stepping current to said second winding.

9. A stepping circuit for stepping a rotor shaft in response to the application of a plurality of input signals each having a first or second value, said stepping circuit comprising: first means for generating first and second stepping currents having first and second polarities in a selected one of four different polarity configurations, said first means being responsive to every input signal having the first value when any selected one of said four configurations is being generated for changing the polarity of one of said stepping currents and being responsive to every input signal having the second value when said same selected one of said configurations is being generated to reverse the polarity of the other of said stepping currents; and a motor including a rotor shaft and a stator element, said rotor shaft having a plurality of equally spaced salient poles thereon and said stator element having a pole group thereon, said pole group including first, second, third, and fourth salient poles, said first and second poles having a first motor winding wound thereon and said third and fourth poles having a second motor winding wound thereon, said motor being responsive to the application of said first stepping current to said first winding and said second stepping current to said second winding for generating a predetermined one of four magnetically stable positions and for propelling said rotor shaft thereto, said four magnetically stable positions being equally spaced between corresponding points of adjacent rotor poles.

10. A stepping circuit for stepping a motor shaft one step in one direction of rotation in response to the application of an input signal having a first value and one step in an opposite direction of rotation in response to the application of an input signal having a second value, said stepping circuit comprising: first means selectively operable for generating first and second stepping currents, each current having first and second polarities, in four different polarity configurations, said first means being responsive to the input signal having the first value, when any selected one of said four configurations is being generated, for changing the polarity of only one of said stepping currents and being responsive to the input signal having the second value when said same selected one of said configurations is being generated to reverse the polarity of only the other of said stepping currents, said first means including a bistable element for generating a bilevel signal having first and second levels and said bistable element being responsive to the receipt of the input signal to change the level of said bilevel signal, said first means further including first and second gating circuits, said first gating circuit generating said first stepping current having its first polarity when said bilevel signal has its first level and said second stepping current has its second polarity and said second gating circuit generating said second stepping current having its first polarity when said bilevel signal has its second level and said first stepping current has its first polarity; a motor including a first motor winding and a second motor winding; and conductive means for applying said first stepping current to said first winding and said second stepping current to said second winding.

References Cited in the file of this patent

UNITED STATES PATENTS 2,774,026    Towner _____ Dec. 11, 1956